United States Patent
Miller

(12) United States Patent Miller
(10) Patent No.: US 6,558,095 B2
(45) Date of Patent: May 6, 2003

(54) NUT LOCKING CLIP ASSEMBLY

(76) Inventor: Andrew J. Miller, 8831 Manton Ave., Plymouth, MI (US) 48170

( * ) Notice: Subject to any disclaimer, the term of this patent is extended or adjusted under 35 U.S.C. 154(b) by 0 days.

(21) Appl. No.: 09/774,508

(22) Filed: Jan. 31, 2001

(65) Prior Publication Data

US 2003/0059273 A1 Mar. 27, 2003

(Under 37 CFR 1.47)

Related U.S. Application Data

(60) Provisional application No. 60/179,266, filed on Jan. 31, 2000.

(51) Int. Cl.$^7$ .................. F16B 39/10; F16B 39/284
(52) U.S. Cl. .................. 411/121; 411/112; 411/927; 411/970
(58) Field of Search .................. 411/111, 112, 113, 411/119, 120, 121, 927, 970

(56) References Cited

U.S. PATENT DOCUMENTS

| | | | | | |
|---|---|---|---|---|---|
| 793,088 | A | * | 6/1905 | Pariso | ................. 411/121 |
| 911,063 | A | * | 2/1909 | Offutt et al. | ................. 411/121 |
| 1,134,792 | A | * | 4/1915 | Will | ................. 411/121 |
| 2,190,076 | A | * | 2/1940 | Love | ................. 411/120 |
| 5,362,111 | A | * | 11/1994 | Hargin | ................. 411/121 X |

FOREIGN PATENT DOCUMENTS

| | | | | |
|---|---|---|---|---|
| GB | 10334 | * | of 1907 | ................. 411/121 |

* cited by examiner

Primary Examiner—Neill Wilson
(74) Attorney, Agent, or Firm—Clark Hill PLC

(57) ABSTRACT

A nut locking clip assembly holds a nut in a desired orientation. The clip assembly has a first member or arm secured to a structure. A second arm is secured to the first arm through a spring portion. The first member defines a hole whereas the second member defines a longitudinal opening. The longitudinal opening has two edges define a width that is slightly wider than the width of the nut head. When the nut is threaded into the structure through the hole in the first member, it is oriented to allow the second member to slide over the nut. The edges of the longitudinal opening or slot prevent the edges of the nut from rotating. To remove the nut, the second member is forced back toward the first member allowing the nut to rotate.

7 Claims, 1 Drawing Sheet

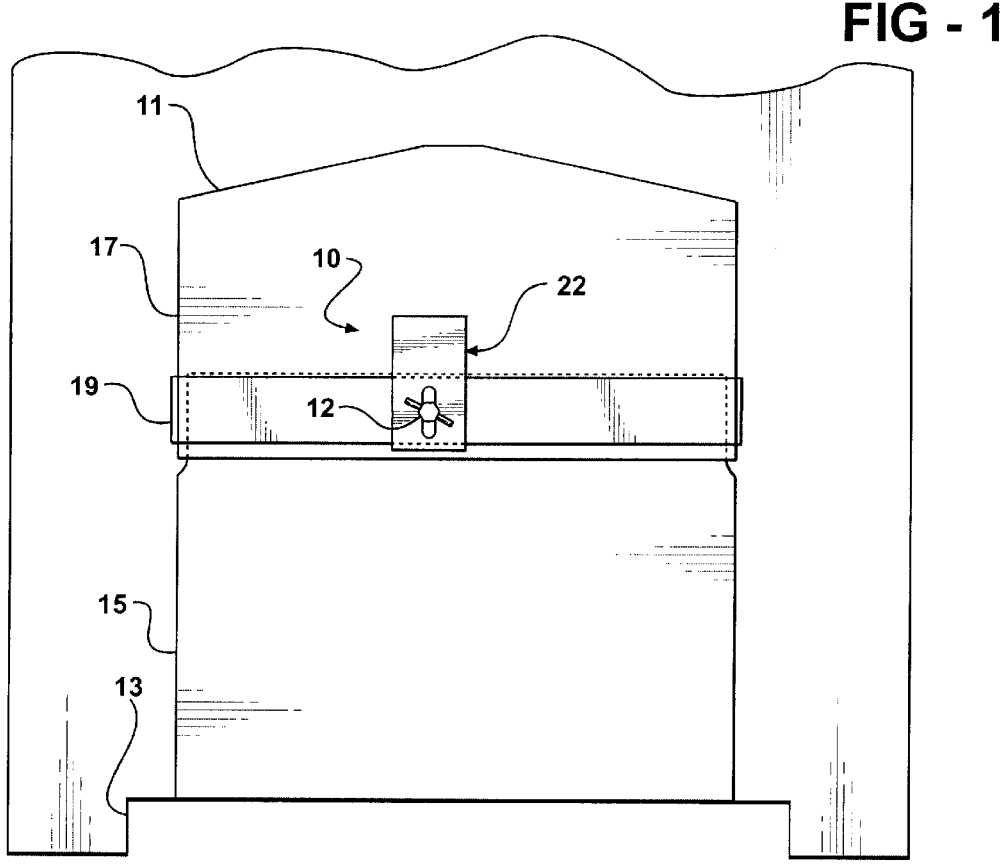
FIG - 1
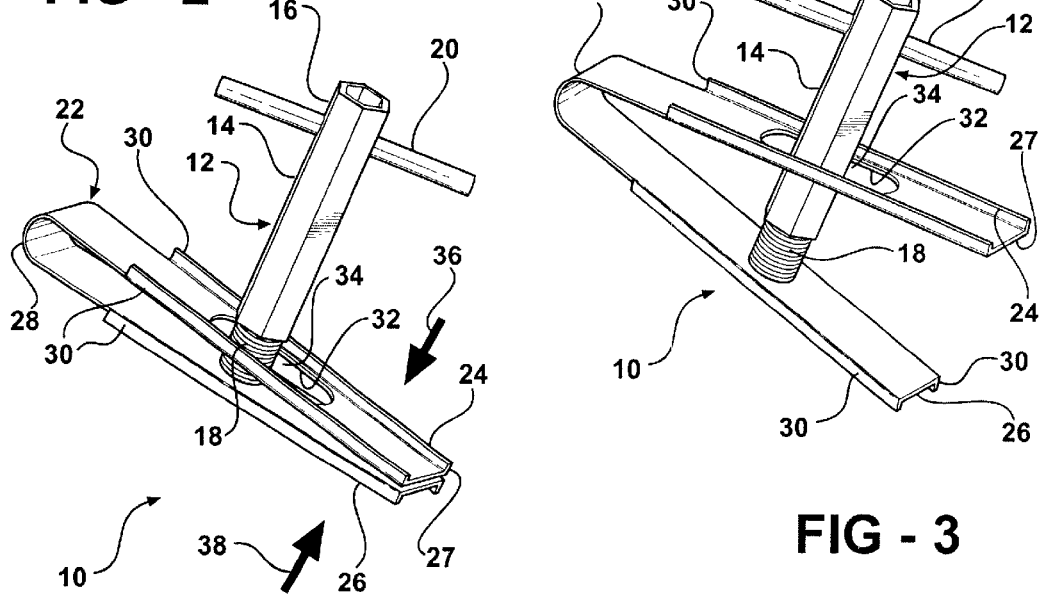
FIG - 2
FIG - 3

NUT LOCKING CLIP ASSEMBLY

This application claims the benefit of provisional application No. 60/179,266 filed Jan. 31, 2000.

BACKGROUND OF THE INVENTION

1. Field of the Invention

The invention relates to a fastening assembly for motor vehicles. More specifically, the invention relates to a fastening assembly that is used to maintain a band clamp at a particular tightness around a centrifugal rotor filter housing to prevent the housing from becoming loose or separating.

2. Description of the Related Art

Centrifugal rotors are used to filter lubricants and fluids found in the internal combustion engine environment. The centrifugal rotors become very dirty as the filter collects particles and debris flowing through the lubricants and require maintenance on a regular basis. Typically, the assembly of the centrifugal rotor is held together using a band clamp or some similar securing device. This device is held in position by a nut. The nut must be locked in place while the internal combustion engine is operating. Therefore, the typical nut is a friction-locking nut. The problem with a friction-locking nut is related to the condition of the environment. More specifically, the environment surrounding a centrifugal rotor is contaminated with dirt. The environment is also very dynamic, with vibrations and wind currents constantly moving the dirt around. These conditions severely degrade the performance of surfaces designed to be held in place due to friction. And because the nuts on the centrifugal rotor must be removed several times during the life thereof to provide maintenance to the centrifugal rotor, the friction locking characteristics of the nuts deteriorate drastically with time.

SUMMARY OF THE INVENTION

A nut locking clip assembly for holding a nut having at least two sides in a specific orientation with respect to a structure is disclosed. The nut locking clip assembly includes a first member fixedly secured to the structure. The first member extends between two ends and defines a hole. A spring portion extends out from one of the two ends of the first member. A second member is secured to the spring portion. The second member defines a longitudinal opening extending therethrough. The longitudinal opening includes two edges extending parallel to each other. The distance or width between the two edges is allows the nut to pass therethrough when two sides of the nut are parallel to the two sides of the longitudinal opening.

BRIEF DESCRIPTION OF THE DRAWINGS

Advantages of the invention will be readily appreciated, as the same becomes better understood by reference to the following detailed description when considered in connection with the accompanying drawings, wherein:

FIG. 1 is a schematic drawing of the environment in which the inventive method operates;

FIG. 2 is a perspective view of one embodiment of the invention in a compressed state; and FIG. 3 is a perspective view of one embodiment of the invention in a free state.

DETAILED DESCRIPTION OF THE PREFERRED EMBODIMENT

Referring to FIG. 1, the invention is generally indicated at 10. The invention 10 is used in environments that are prone to be corrosive and dirty. While the invention 10 is shown to be used in conjunction with a filter assembly 11, it should be appreciated by those skilled in the art that the invention 10 could be used in any environment that requires the prevention of the rotation of a nut or similar fastening device.

The filter assembly 11 is mounted to a structure 13 at the base thereof. The filter assembly 11 includes a bottom half 15 and a top half 17. The two halves 15, 17 overlap each other to enclose the interior thereof. A band clamp 19 is used to secure the top half 17 over the bottom half 15. The top half 17 frictionally engages the bottom half 15 and the band clamp 19 applies a force sufficient to prevent the top half from separating from the bottom half 15.

Referring to the Figures, the invention is a nut locking clip assembly 10. The nut locking clip assembly 10 includes a nut, generally shown at 12. The nut 12 may be used to adjust the tension of the band clamp 19 or secure the band clamp 19 in a particular position.

The nut 12 includes an elongated body 14 extending between a handle end 16 and a distal end 18. The handle end 16 includes a handle 20 extending therethrough perpendicularly to the elongated body 14. The handle 20 aids in the tightening and loosening of the nut 12. The handle 20 may be removable or, in the alternative, not used at all. If not used, a tool may be used to turn the nut 12.

The elongated body 14 includes a hexagonal portion extending along the handle end 16 and a single sided end extending along the distal end 18. In cross-section, the single sided end is a circle resulting in a cylindrical threaded end 18. It may be appreciated by those skilled in the art that other cross-sectional shapes may be used in place of those depicted in the Figures.

The nut locking clip assembly 10 includes a clip, generally shown at 22. The clip 22 is fixedly secured to a structure (not shown) in a manner such that the clip 22 will have no rotational or pivotal motion with respect to the structure. The clip 22 may be secured to the structure using any means suitable for the environment in which the nut locking clip assembly 10 is to be used. The clip 22 includes a first member or half 24 and a second member or half 26 separated by a spring portion 28. The spring portion 28 biases the first half 24 away from the second half 26. The first 24 and second 26 halves include flanges 30 which strengthen their respective halves 24, 26. The first half 24 includes a longitudinal opening 32 having parallel sides 34 (one shown). The second half 26 includes a circular opening (not shown). The second half 26 extends out to a distal end 27.

In operation, the nut locking clip assembly 10 is shown in the compressed state in FIG. 2. In this state, forces, generated in the directions represented by arrows 36, 38, bias the distal end 27 of the second member or half 26 into an abutting relationship with the first member or half 24. When in this compressed state, the cylindrical threaded end 18 is received by the longitudinal opening 32. Because the distal end 18 is cylindrical, the nut 12 is unlocked and free allowing it to move rotationally.

Referring to FIG. 3, the clip 22 is in the free state due to the absence of the forces 36, 38. In the free state, the first half 24 is disposed apart from the second half 26 due to the spring portion 28 forcing the two halves 24, 26 apart. When released, the parallel edges 34 of the longitudinal opening 32 move over the flat sides of the hexagonal portion of the elongated body 14. The width of the longitudinal opening 32 is slightly greater than the distance between parallel flat sides of the hexagonal portion of the elongated body 14. Therefore, the nut 12 is prevented from moving rotationally with respect to the clip 22 because the parallel edges 34 defined by the flat sides of the hexagonal portion of the elongated body 14 will abut the parallel edges 34 of the longitudinal opening 32.

The nut 12 is prevented from rotating by the edges of the flat sides of the elongated body 14 positively engaging the parallel edges 34 of the longitudinal opening 32. The ability to obstruct the path of rotation is much stronger than overcoming the frictional forces that may be generated by the nut 14 by a lateral surface engaging another flat surface of the filter assembly 11 or the band clamp 19. Further, the force required to overcome the obstruction generated by the nut locking clip assembly 10 does not deteriorate as a function of time or due to the level of contaminants, i.e., dirt, that may be introduced into the environment.

The invention has been described in an illustrative manner. It is to be understood that the terminology that has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A nut locking clip assembly for holding a nut having at least two sides in a specific orientation with respect to a structure, said nut locking clip assembly comprising:

a first member fixedly secured to the structure, said first member extending between two ends and defining a hole, said first member including flanges for strengthening said first member;

a spring portion extending out from one of said two ends of said first member; and a second member fixedly secured to said spring portion such that said first and second members and said spring portion are fabricated from a single element, said second member defining a longitudinal opening extending therethrough, said longitudinal opening including two edges extending parallel to each other a distance apart such that the nut may pass therethrough when two sides of the nut are parallel to said two edges of said longitudinal opening and the nut is prevented from passing therethrough when the nut is in an orientation such that none of the sides of the nut are parallel to said two edges of such longitudinal opening.

2. A nut locking assembly as set forth in claim 1 wherein said second member includes flanges for strengthening said second member.

3. A nut locking clip assembly as set forth in claim 2 wherein said hole extending through said first member allows the nut to engage the structure therebehind.

4. A nut locking clip assembly as set forth in claim 1 wherein said spring portion extends through an arcuate path.

5. A nut locking clip assembly as set forth in claim 4 wherein said spring extends between said first and second portions.

6. A nut locking clip assembly as set forth in claim 5 wherein said first member receives an external force at one of said two ends opposite said end secured to said spring portion.

7. A nut locking clip assembly as set forth in claim 6 wherein said second member includes a distal end for receiving an external force to move said distal end toward said first member.

* * * * *